United States Patent [19]

Bowers

[11] 3,730,474
[45] May 1, 1973

[54] MIRROR POSITIONING DEVICE
[75] Inventor: William H. Bowers, Holicong, Pa.
[73] Assignee: Delbar Products, Inc., Perkasie, Pa.
[22] Filed: May 14, 1971
[21] Appl. No.: 143,554

[52] U.S. Cl................248/478, 248/289, 248/475 B
[51] Int. Cl................................................B60r 1/06
[58] Field of Search..................248/145, 282, 285, 248/289, 475 B, 478, 479; 287/87

[56] References Cited

UNITED STATES PATENTS

| | | | |
|---|---|---|---|
| 2,565,012 | 8/1951 | Barrett | 248/475 B |
| 3,407,997 | 10/1968 | Wood et al. | 248/145 X |
| 3,374,016 | 3/1968 | Melton et al. | 287/87 |
| 3,119,591 | 1/1964 | Malecki | 248/282 |
| 3,642,245 | 2/1972 | Wohnlich | 248/475 B |
| 3,322,388 | 5/1967 | Budrech | 248/475 B |

Primary Examiner—William H. Schultz
Attorney—Howson & Howson

[57] ABSTRACT

A positioning device for external truck type rear view mirrors which holds the mirror bracket in a normal outwardly extending operating position, but upon application of a predetermined force to the bracket, permits the pivoting of the bracket inwardly toward the vehicle. The device includes upper and lower detent elements attached to the mirror bracket arms which are axially aligned in rotatable relation by the cooperation of a cylindrical portion of one element with an axial bore of the other element. The detent elements are maintained in spring biased relation by a plurality of spring washers held in compression by a cover formed around the detent portions of the elements.

14 Claims, 3 Drawing Figures

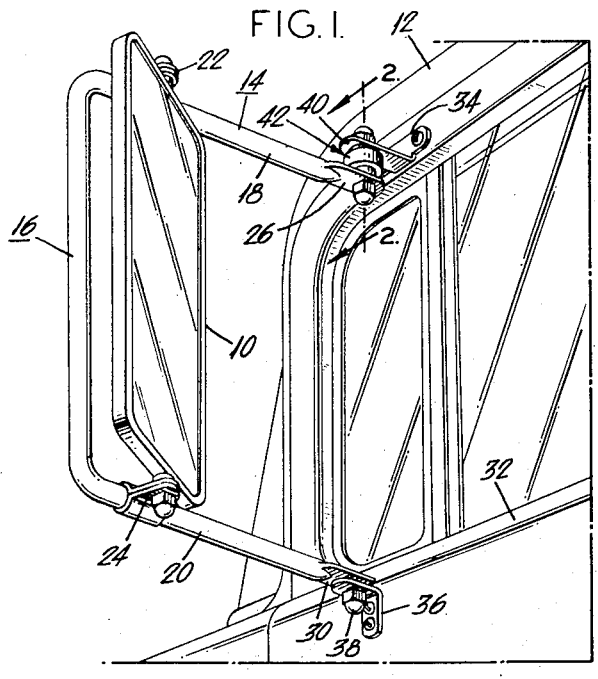
FIG. 1.
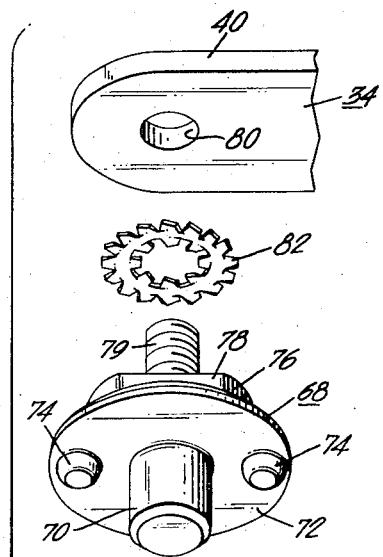
FIG. 3.
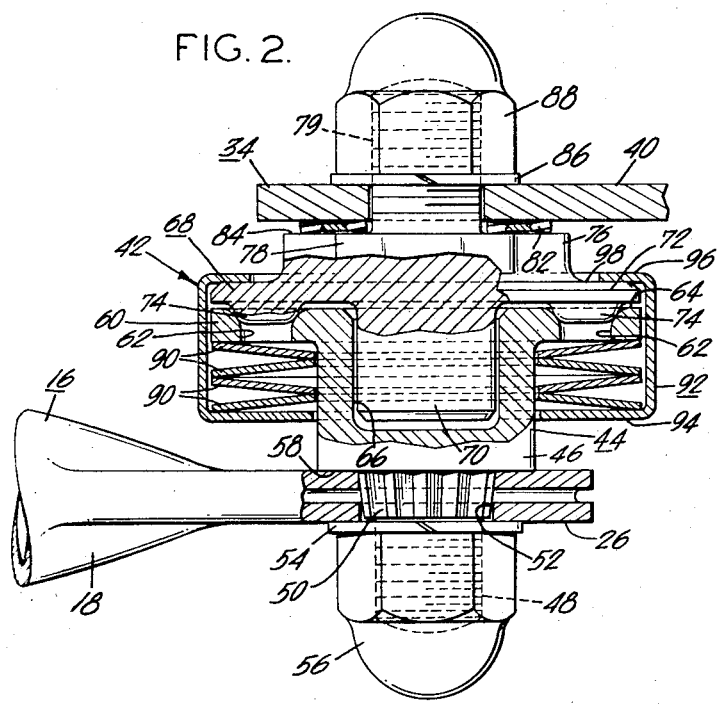
FIG. 2.
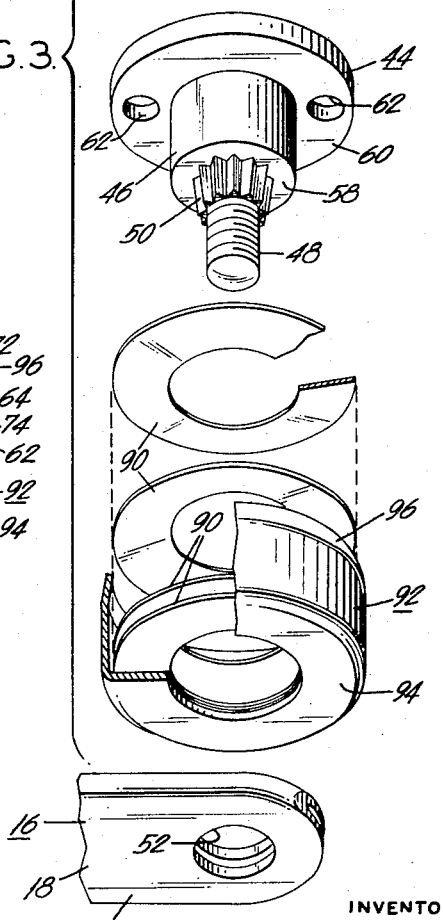
INVENTOR:
WILLIAM H. BOWERS
BY
Howson & Howson
ATTYS.

MIRROR POSITIONING DEVICE

The present invention relates generally to mounting arrangements for external vehicle rear view mirrors and relates more particularly to a novel mirror bracket positioning device which holds a mirror bracket in a predetermined outwardly extending operating position during normal vehicle operation but permits the mirror to be swung inwardly against the vehicle upon striking an obstruction or for the purpose of narrowing the width of the vehicle to clear an obstruction.

Externally mounted truck rear view mirrors usually extend outwardly a substantial distance beyond the truck cab to enable the driver to obtain a clear view to the rear around the cargo carrying portion of the truck which is generally wider than the cab. Because of its vulnerable position extending beyond any portion of the truck proper, the mirror is constantly subject to contact with obstructions of various types, particularly in crowded loading terminals and narrow city streets.

To prevent destruction of the mirror and bracket upon hitting an obstruction, and to permit the retraction of the mirror during close quarter maneuvering, it is conventional to pivotally mount the mirror bracket so that the entire assembly may swing inwardly toward the side of the vehicle. It is in addition conventional to provide means in the pivotal mounting arrangement which will permit return of the mirror and bracket to a normal driving position. One such arrangement is shown in U.S. Pat. No. 3,119,591, assigned with the present application to a common assignee.

In general, prior devices permitting pivotal movement of the mirror bracket from a normal driving position to which the bracket may be returned have included a central shaft carrying detent and spring members which are drawn together by a nut on the threaded shaft end. Although effective for carrying out their intended purpose, such devices must be properly adjusted to provide the proper breakaway force. If the mirror is too rigidly held by the device, the mirror and bracket may be severely damaged on striking an obstruction. If on the other hand the mirror is not securely held by the device, it will break loose from the proper driving position without cause, for example due to rough roads, truck vibration, high winds, etc.

In addition to the problem of adjustment, prior devices due to their general complexity and large number of parts are relatively expensive to manufacture and assemble. They are furthermore subject to disassembly should the securing nuts thereof become loosened during service.

In the present invention, a mirror bracket positioning device is provided which is of a greatly simple structure and which does not include the conventional central threaded securing member for carrying the various spring and detent elements. In the present device, an upper detent element includes a coaxial cylindrical portion which is received within a coaxial bore in the lower detent element. The upper and lower detent elements are axially biased together by a plurality of spring washers which are sealed within and bear against a cover which is flanged to encompass the upper and lower detent elements and the spring washers and secures the elements in a predetermined non-adjustable spring biased relation. Not only is adjustment eliminated, but disassembly, either accidental or deliberate, is not possible. The respective threaded ends of the upper and lower detent elements are secured to the mirror bracket members by suitable locking means. Since the bracket members form no part of the positioning device, the device may be readily replaced in the field if necessary.

It is accordingly a first object of the present invention to provide an improved mirror bracket positioning device for truck type mirrors.

A further object of the invention is to provide a positioning device as described having cooperating detent elements which are permanently assembled in spring loaded relation and require no adjustment.

Another object of the invention is to provide a positioning device as described of a relatively simple construction which can be economically manufactured and readily replaced as a preadjusted unit.

Additional objects and advantages of the invention will be more readily apparent from the following detailed description of an embodiment thereof when taken together with the accompanying drawings wherein:

FIG. 1 is a perspective view of a truck mirror, the mounting bracket of which is secured to the cab of a truck utilizing a positioning device in accordance with the present invention;

FIG. 2 is an enlarged vertical sectional view taken along line 2—2 of FIG. 1 through the positioning device; and FIG. 3 is an exploded perspective view of the elements comprising the positioning device.

Referring to the drawings, and particularly FIG. 1 thereof, a mirror head 10 is shown mounted on a truck cab 12 by means of a mounting assembly generally designated 14. The assembly 14 includes a U-shaped guard bracket 16 having upper and lower horizontal arms 18 and 20 to which the mirror is respectively attached by means of upper and lower mirror support brackets 22 and 24. The inner ends 26 and 30 respectively of the arms 18 and 20 are flattened in a horizontal plane as illustrated and are pivotally secured to the door 32 of the truck cab 12 by upper and lower mounting brackets 34 and 36 which are screwed to the door 32, the upper bracket 34 being attached above the door windows, while the lower bracket 36 is mounted below the windows.

The lower bracket 36 is a simple L-shaped member, the horizontal portion thereof having a bore therein to receive a vertical bolt 38 which passes through the flattened inner end 30 of the arm 20 to pivotally secure the lower end of the bracket 16 in a well known manner.

The upper bracket 34 includes a generally horizontal bracket arm 40 which extends outwardly in spaced parallel relation to the inner end 26 of the upper support arm 18. A positioning device generally designated 42 in accordance with the present invention is disposed between the arm 40 and end 26 of arm 18 to secure the upper end of the bracket 16 in a manner to be presently described.

Referring to FIGS. 2 and 3 of the drawings, the positioning device 42 includes a lower detent element 44 which has a cylindrical central portion 46 from which a threaded coaxial shaft portion 48 of reduced diameter extends downwardly. A tapered splined portion 50 is provided intermediate the cylindrical portion 46 and the threaded portion 48. As shown in FIG. 2, the lower detent element 44 is secured to the flattened inner end 26 of the arm 18, the threaded portion 48 and splined portion 50 extending through a bore 52 in the arm. A lock washer 54 and a nut 56 on the threaded portion 48 are tightened to draw the bottom surface 58 of the cylindrical portion 46 of the element 44 into engagement with the upper surface of the flat end 26 of the arm 18. The splined portion 50 should be tapered so that the lower portion thereof will pass through the bore 52 with slight clearance, while the upper portion thereof will interfere with the bore edges, thereby biting into the walls of the bore and securing the lower detent element against rotation with respect to the arm 18.

The lower detent element 44 includes at its upper end an outwardly extending flange portion 60 in which are located a pair of diametrically opposed detent sockets 62 which pass vertically through the flange portion. As shown most clearly in FIG. 2, the detent sockets 62 are flared at their intersection with the upper surface 64 of the element 44. The cylindrical portion 46 of the element 44 also includes a coaxial bore 66 extending partway therethrough from the upper surface 64 as shown in FIG. 2.

An upper detent element generally designated 68 includes a central cylindrical portion 70 which is adapted to slidably fit within the bore 66 of the lower detent element 44. A radially extending flange portion 72 of the element 68 includes a pair of diametrically opposed detent projections 74 which are adapted to align with and be cooperatively received by the decent sockets 62 in the lower detent element 44. The projections 74 are as illustrated of a truncated spheroidal shape to facilitate their sliding entrance into and exit from the detent socket 62.

Above the flange portion 72, the upper detent plate 68 includes a cylindrical body portion 76 having flats 78 on each side thereof. A threaded shaft portion 79 extends coaxially above the body portion 76 and is adapted to pass through a bore 80 in the bracket arm 40. An internal-external toothed lock washer 82 is provided between the upper surface 84 of the cylindrical portion 76 of the element 68 and the lower surface of the arm 40. A lock washer 86 and a nut 88 on the threaded shaft portion 79 secure the element 68 to the arm 40.

The upper detent element 68 is maintained in spring biased engagement with the lower detent element 44 by a plurality of spring washers 90 surrounding the cylindrical portion 46 of the lower detent element in conjunction with the generally cylindrical cover 92. The cover includes an annular bottom portion 94 against which the lowermost spring washer bears and an inwardly extending upper flange portion 96 overlapping the upper surface 98 of the flange portion 72 of element 68.

As shown in the exploded view of FIG. 3, the flange 96 of the cover is open to a nearly vertical position to accept the spring washers and the upper and lower detent elements there-within during the assembly of the device. With the spring washers resting on the annular bottom portion 94 of the cover, the lower detent element and upper detent element are placed in position and the spring washers compressed during the forming of the flange portion 96 from the condition shown in FIG. 3 to that shown in FIG. 2. It will be apparent that this manner of assembly will produce a predetermined non-adjustable spring biasing of the upper and lower detent elements with the result that the elements, when in the detent position shown in FIG. 2, can only be rotated with respect to each other upon the application of a predetermined torque to one of the elements with the other element being held against rotation. The proper spring leading of the detent elements can accordingly be sealed into the device during manufacture and it will not thereafter be necessary to readjust the device, nor can vibration or attempted adjustment in any way affect the proper operation of the device.

Although in the illustrated embodiment four spring washers 90 are shown, the number may of course be varied depending on the characteristics of the washers and the spring pressure desired. The spring washers shown are of a type known as "Belleville" washer spring which, as illustrated, have a generally frusto-conical configuration and are hence arranged in an alternately inverted order.

For installation of the positioning device 42, the lower detent element 44 is attached to the end 26 of bracket arm 18 in the manner shown in FIG. 2, the nut 56 being drawn up securely against the lock washer 54 and arm end portion 26 to draw the splined portion 50 downwardly against the walls of bore 52 until the shoulder 58 of the element 44 seats against the arm end. The element 44 is then locked against rotation with respect to the arm 18 and need not again be in any way repositioned or adjusted. The relationship of the detent sockets 62 with the arm 18 is not important and the sockets are shown aligned with the arm 18 in FIG. 2 only for purposes of illustration.

To complete the installation of the positioning device, the threaded shaft portion 79 of the upper detent element 68 is secured in the manner illustrated in FIG. 2 to the arm 40 of the bracket 34 by tightening the nut 88 to the lock the lock washers 82 and 86. Before tightening the nut 88, with the detent projections 74 seated in the detent sockets 62, the bracket 16 should be set in the desired normal driving position. The nut 88 is then tightened to complete the installation and adjustment of the device.

During normal truck operation, the bracket 16 is held at the desired angle by the seating of the detent projections in the detent sockets with the spring washers 90 axially biasing the detent elements together to maintain the engaged relationship of the projections and sockets. Should the mirror bracket strike an obstruction or should it be desired to swing the bracket inwardly to clear an obstruction, the bracket 16 and mirror 10 may swing forwardly or rearwardly toward the vehicle cab. A substantial initial rotating force on the bracket 16 is initially required to free the projections 74 from the sockets 62 since this requires the upward displacement of the upper detent element and cover against the spring force and against the restraining force of the projection and socket walls. Once the projections have been freed from the sockets, the swinging of the bracket may be readily accomplished with relatively little resistance from the positioning device as the detent projections slide across the surface 64 of the lower detent element.

To reset the bracket and mirror in the normal driving position, the bracket is simply rotated outwardly until the detent projections seat within the detent sockets, a position which will be readily noted as the device will "lock" into place. The mirror can obviously be actuated in this manner from the cab of the vehicle and may be quickly manipulated as necessary to avoid obstacles.

Should adjustment of the normal driving position be required, this may be quickly accomplished by loosening the nut 88 and shifting the position of the upper detent element with respect to the arm 40. The nut 88 is retightened at the new preferred bracket position to complete the adjustment. The flats 78 on the cylindrical portion 76 of the upper detent element are useful for gripping the upper element during the loosening and tightening of the nut 88.

As suggested above, the spring washers 90 may be varied in number and, in fact, a single spring washer of suitable spring force could be employed. Other spring means such as one or more coil springs or an elastomeric spring could also be utilized to urge the detent elements together under a predetermined resilient force.

Although for simplicity of illustration the positioning device 42 is shown adjacent the vehicle door in connection with a simple mirror bracket known in the trade as a "Junior West Coast" mounting arrangement, it will be apparent that the present positioning device is equally well suited for use with the more complicated "West Coast" mounting arrangement such as shown in the above cited U.S. Pat. No. 3,119,591. It will further be apparent that the device may be attached to either the upper or the lower mirror bracket support arm or to both support arms to provide additional rigidity in the detent position. In addition, the device could be coupled directly to the mirror head.

Another obvious modification includes the provision of two or more detent positions to permit the mirror to be selectively positioned to suit the load or trailer behind the truck cab. Such a modification would require one or more sets of additional detent sockets.

By using the present positioning device to position both the bracket and the mirror head, and by including one or more additional detent positions, predetermined detent positions of the bracket and mirror could be built into the assembly to provide fixed inner and outer mirror positions. When driving a tractor without a trailer, for example, the bracket could be swung inwardly to an inner detent position and the mirror rotated outwardly to a second detent position to reduce the outward extension of the assembly.

It will be obvious that minor changes could be effected in the device. For example, more than two detent projections and sockets could be employed for a given detent position. Further, the lock washers 54 and 86 could be replaced by serrations on the adjacent bracket arm surfaces.

Manifestly, changes in details can be effected by those skilled in the art without departing from the spirit and scope of the invention.

I CLAIM:

1. A mirror positioning device comprising first and second detent elements, means on said detent elements for providing an axially aligned relatively rotatable cooperation of said elements, means on each of said elements for attachment of a bracket arm thereto, an annular radial flange portion on each of said elements in juxtaposed relation with the flange portion of the other of said elements, a cylindrical cover having axially spaced radial flanges extending inwardly therefrom and surrounding said detent element flange portions, spring means disposed within said cover serving to bias said detent elements together under a predetermined pressure, said spring means being seated on one of said cover flange portions and urging said detent element flange portions together toward the other of said cover flange portions, and detent means cooperatively disposed on juxtaposed faces of each said detent element flange portions, said detent means being adapted upon alignment of the device in a normal operation position to maintain a predetermined relative position of the bracket arms attached thereto but permitting relative rotation thereof upon the application of sufficient force to one of the bracket arms.

2. The invention as claimed in claim 1 wherein said means on said detent elements for providing an axially aligned relatively rotatable cooperation of said elements comprises a cylindrical coaxial portion of one of said elements, and a coaxial bore in the other of said elements adapted to receive said cylindrical portion.

3. The invention as claimed in claim 1 wherein said means on each of said elements for attachment of a bracket arm thereto comprises a coaxial outwardly extending threaded portion of each said elements.

4. The invention as claimed in claim 1 wherein said spring means disposed within said cover comprises a plurality of spring washers disposed in compression between one of said detent elements and a portion of said cover means.

5. The invention as claimed in claim 1 wherein said detent means comprises a plurality of detent projections on a face of one of said detent elements, and a plurality of detent sockets on the juxtaposed face of the other said detent elements.

6. The invention as claimed in claim 5 wherein said detent projections comprise a pair of diametrically opposed projections and wherein said detent sockets comprise a pair of diametrically opposed sockets adapted for alignment with said projections.

7. A mirror positioning device comprising upper and lower detent elements, said lower detent element comprising a cylindrical body portion, a coaxial bore extending partway into said cylindrical body portion from the upper end thereof, a radial flange portion extending outwardly from the upper end of said body portion, said upper detent element having a cylindrical downwardly extending portion extending into the bore of said lower detent element to maintain said elements in axially aligned rotatable relation, a flange portion of said upper detent element extending radially outwardly in juxtaposed relation with the flange portion of said lower detent element, a substantially cylindrical cover extending around the flange portions of said upper and lower detent elements, said cover having an upper flange portion extending inwardly over the flange portion of said upper detent element, said cover including a lower inwardly directed flange portion, spring means disposed around the cylindrical body portion of said lower detent element, detent means cooperatively disposed on the juxtaposed faces of said upper and lower detent elements, and means on each said detent element for attachment thereof to a mirror bracket assembly member, said cover compressing said spring means to bias said detent elements together under a predetermined force, said detent means when in alignment defining a predetermined relative angular position of said detent elements, said detent elements being rotatable from the detent position upon application of a predetermined torque thereto.

8. The invention as claimed in claim 7 wherein said spring means comprises a plurality of spring washers disposed in alternately inverted relation.

9. The invention as claimed in claim 7 wherein said detent means comprises a plurality of detent projections on a face of one of said detent elements, and a plurality of detent sockets on the juxtaposed face of the other said detent element.

10. The invention as claimed in claim 9 wherein said detent projections comprise a pair of diametrically opposed projections and wherein said detent sockets comprise a pair of diametrically opposed sockets adapted for alignment with said projections.

11. The invention as claimed in claim 10 wherein said means on each said detent element for attachment thereof to a mirror bracket assembly member comprises a threaded coaxial portion of the lower detent element extending downwardly from the cylindrical body portion thereof, and a threaded coaxial portion of said upper detent element extending upwardly in coaxial alignment with said cylindrical portion thereof.

12. A positioning device for releasably maintaining a predetermined angular relation of two relatively rotatable members, said device comprising first and second detent elements, means on each of said elements for attachment of one of said relatively rotatable members thereto, each of said detent elements including a radial flange portion extending outwardly therefrom in juxtaposed relation to the flange portion of the other of said detent elements, detent means cooperatively disposed on the juxtaposed faces of said detent elements, a substantially cylindrical cover extending around the flange portions of said detent elements, said cover having axially spaced flange portions extending radially inwardly over the flange portions of said detent elements whereby said detent element flange portions are disposed between said spaced cover flange portions, spring means within said cover disposed in compression between a flange portion of said cover and one of said detent element flange portions to bias said juxtaposed detent element flange portions together under a predetermined force, said detent means when in alignment defining a predetermined relative angular position of said detent elements, said detent elements being rotatable from the detent position upon application of a predetermined torque thereto.

13. A positioning device as claimed in claim 12 including a cylindrical coaxial portion of one of said detent elements, and a coaxial bore in the other of said elements adapted to rotatably receive said cylindrical portion to maintain said detent elements in axially aligned rotatable relation.

14. A positioning device for releasably maintaining a predetermined angular relation of two relatively rotatable members, said device comprising upper and lower detent elements, said lower detent element comprising a cylindrical body portion, a coaxial bore extending partway into said cylindrical body portion from the upper end thereof, a radial flange portion extending outwardly from the upper end of said body portion, said upper detent element having a cylindrical downwardly extending portion extending into the bore of said lower detent element to maintain said elements in axially aligned rotatable relation, a flange portion of said upper detent element extending radially outwardly in juxtaposed relation with the flange portion of said lower detent element, a substantially cylindrical cover extending around the flange portions of said upper and lower detent elements, said cover having an upper flange portion extending inwardly over the flange portion of said upper detent element flange portion, said cover including a lower inwardly directed flange portion extending inwardly beneath said lower detent element flange portion, detent means cooperatively disposed on the juxtaposed faces of said upper and lower detent elements, spring means in compression in said cover between one of said cover flange portions and one of said detent flange portions adapted to bias said detent elements together under a predetermined force, and means on each of said detent elements for attachment of one of said relatively rotatable members thereto, said detent means when in alignment defining a predetermined relative angular position of said detent elements, said detent elements being rotatable from the detent position upon application of a predetermined torque thereto.

* * * * *